No. 620,280.　　　　　　　　　　　　　Patented Feb. 28, 1899.
W. T. COLE.
ADDRESSING MACHINE.
(Application filed July 1, 1897.)

(No Model.)　　　　　　　　　　　　　5 Sheets—Sheet 1.

FIG. 1.

WITNESSES　　　　　　　　　　　　　INVENTOR.
　　　　　　　　　　　　　　　　　　WILSON T. COLE.
　　　　　　　　　　　　　　　　BY Paulo Hawley
　　　　　　　　　　　　　　　　　　HIS ATTORNEYS.

No. 620,280. Patented Feb. 28, 1899.
W. T. COLE.
ADDRESSING MACHINE.
(Application filed July 1, 1897.)
(No Model.) 5 Sheets—Sheet 3.

INVENTOR.
WILSON T. COLE.
WITNESSES.

United States Patent Office.

WILSON T. COLE, OF MINNEAPOLIS, MINNESOTA, ASSIGNOR OF ONE-HALF TO ROBERT A. McWILLIAMS, OF SAME PLACE.

ADDRESSING-MACHINE.

SPECIFICATION forming part of Letters Patent No. 620,280, dated February 28, 1899.

Application filed July 1, 1897. Serial No. 643,104. (No model.)

*To all whom it may concern:*

Be it known that I, WILSON T. COLE, of the city of Minneapolis, county of Hennepin, State of Minnesota, have invented certain new and useful Improvements in Addressing-Machines, of which the following is a specification.

My invention relates to printing-machines, and particularly to machines for addressing mail-matter, such as envelops, and especially newspapers.

The objects of the invention are to provide a machine which will automatically and positively engage type held in the path of its moving parts and which will, further, automatically and positively discharge the type after the printing is done.

A further and particular object of the invention is to provide a machine of this class which will operate at a high speed, equaling the speed of a web-press, and which will be of a very simple and durable construction and will require but little attention.

A further and particular object of the invention is to provide an addressing-machine wherein all moving mechanisms are dispensed with for feeding type; and a further object is to provide an addressing-machine wherein all of the parts will have rotary actions, whereby both speed and accuracy are rendered possible.

A further and particular object of the invention is to provide an addressing-machine which will handle one and two line addresses without alteration in the machine or its being necessary to stop and adjust the same.

The invention consists generally in an addressing-machine adapted to receive and hold type and print upon envelops, papers, rolls, or packages, all as hereinafter described, and particularly pointed out in the claims.

The invention will be more readily understood by reference to the accompanying drawings, forming part of this specification, and in which—

As shown in the drawings, 2 represents a suitable base provided at one side with a standard 3, which at its upper end is provided with a long overhanging bearing 4 for the main shaft 5 of the machine.

6 illustrates a stud-shaft provided on the standard 3 and serving as a bearing for the driving-pulley 7, the gear-pinion 8, and the small sprocket-wheel 9. The pinion 8 is connected with the shaft 5 by a large gear-wheel 10. Upon the end of the bearing or arm 4 is a small standard 11 to support and steady the lower end of the type supply or delivery chute or holder 12. Beneath this chute and on the shaft 5, to turn therewith, is a drum 13, secured to the shaft and carrying as many type-carrying heads as may conveniently be located thereon. These heads comprise the T's or yokes 14, provided with shanks 15 to drop into the radial openings provided in the bosses 16 upon the periphery of the drum 13.

Referring to Figs. 5 to 9, which best show the type-carriers, it will be seen that the shank 15 of each T or yoke is held in the boss or sleeve of the drum 13 by a collar 17 on the inner end of the shank. This collar has a short arm 18, provided with a small roller 19 to engage a stationary side cam 20, which cam has a deep notch 21, into which the roller and arm drop at each revolution of the drum. The roller is held against the cam by a coiled spring 22, wound around the boss and having its ends secured in the T 14 and in the drum 13, respectively. (See Fig. 5.) The cam 20 is stationary, being fastened upon the end of the arm 4. For convenience in setting up the machine the cam is preferably made adjustable upon the arm 4 by the use of a set-screw, as shown. A stop 23 (see Fig. 1) limits the rotary movement of the T or head to a movement of about ninety degrees. The yoke 14 carries a crank-shaft 24, pivoted in the sides thereof. The intermediate parts of the crank-shaft are rectangular and serve as guides, upon which the sleeve portions of the jaws or grippers 25 and the pusher and leveling-lugs 26 formed therewith are adapted to move.

Figures 15, 16:
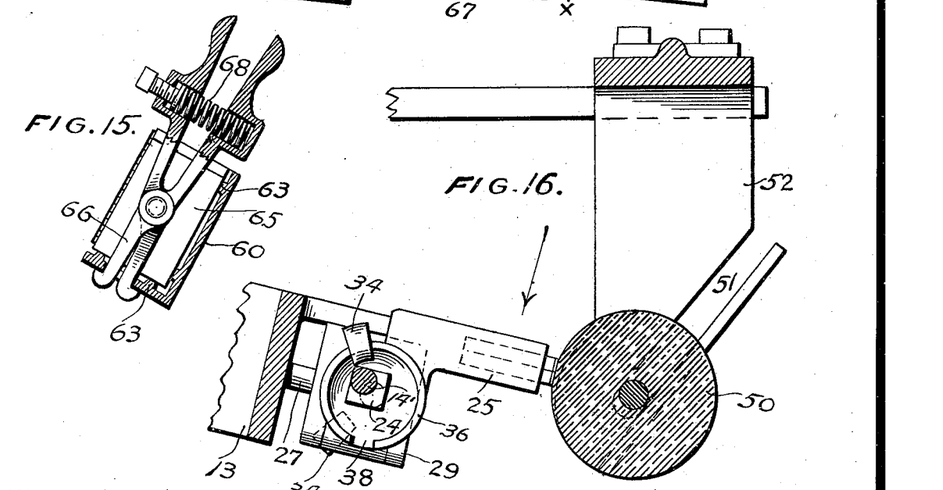
Fig. 15 is a cross-section thereof on the line $x\,x$ of Fig. 14.
Fig. 16 illustrates the position of one of the type-carriers as it passes the inking-roll.

A connecting rod or stem 27 passes through the shank of each T 14 and has its lower end held to slide in the annular web 28, which encircles the shaft 5 and is preferably formed with the drum 13 and rotates therewith. At its upper end the rod 27 is provided with a link 29, preferably integral with the rod 27 and having an elongated opening 30 to receive the crank-block 31 for the crank 14' of the crank-shaft 24, so that upon the longitudinal outward movement of the connecting-rod said crank will be partially rotated. As the crank is rotated so are the jaws and pusher-lugs carried thereby, the same, with the type-slugs held thereby, being raised or tilted into a position perpendicular to the periphery of the drum. This longitudinal movement of the rod 27 to tilt the type-carrying jaws is accomplished by means of a stationary cam 32, attached to the arm about which the drum and the bearing-web 28 rotate. The bosses 16 and the openings 33 in the web 28 are arranged as closely together as possible upon a drum of convenient size. I prefer to employ eight of the same, with eight complete type-carrying heads, as a machine so constructed is of convenient size and will do its work at a high speed. The rod 27 is normally held in a depressed position to hold the jaws down parallel with the surface of the drum, and is so held down by the spring 40, which spring also tends to rotate the rod. The rotary movement of the rod 27 swings the link 29, and thereby separates the gripping-jaws 25, said links being connected with said jaws by other links 34, which, it is to be noted, have sliding connections with the jaws in order that the jaws may be tilted without any upward movement of the links 34. The sliding connection is formed by the employment of a flange 36 upon the sleeve 37 of each jaw 35, said flange being substantially semicircular in cross-section and the ends of the link being made to fit the same, and when once slipped onto the flange being inseparable therefrom, though allowing the flange to slide through the ends of the links. The flanges have notches 38 (see Fig. 16) to permit the ends of the links 34 to be placed thereon when the parts are being assembled. 39 represents a shoulder provided upon the T or yoke 14 to limit the tilting movement of the jaws 25 and the crank-shaft. The rod 27 and the link are rotated periodically by the spring 40, provided thereon and in connection with an arm 41, which rises upon the cam 42, formed or fixed upon the surface 43. The foot 44 of the delivery-chute 12 is of the same internal size as the upper chute-section 12, the slugs fitting nicely therein, and at the lower end the chute is open and has notches 45 in its sides to permit the pusher-lugs 26 to pass through the lower end of the chute. The foot 44 is provided with longitudinal ledges 46, upon which the type-slugs drop and rest. The notch 45 in the forward end of the chute is of the full width thereof to permit the slug to pass out.

Figures 3, 12, 13:
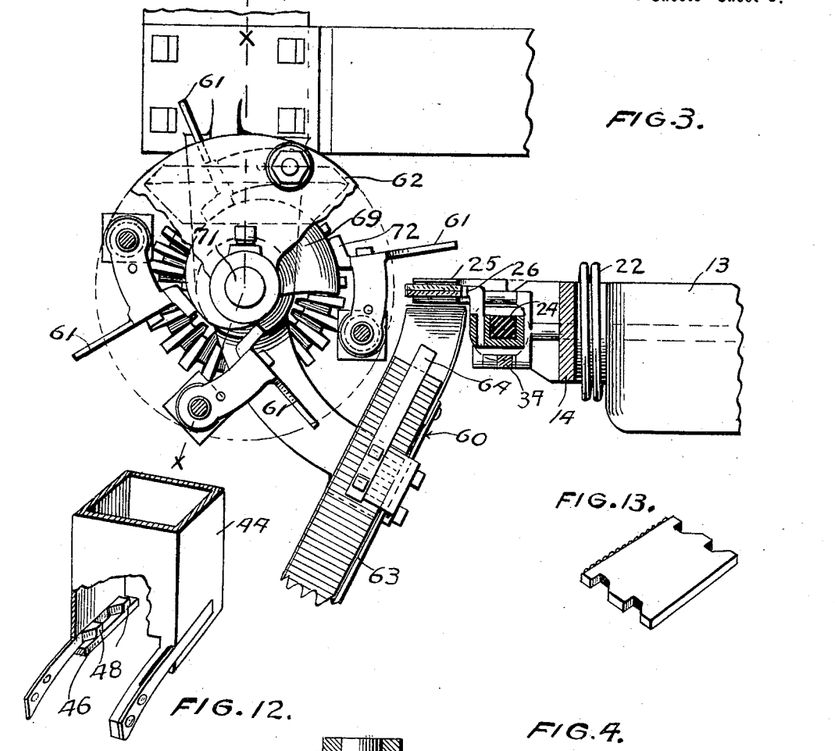
Fig. 3 is a horizontal view on the line $z\,z$ of Fig. 1, one of the type carriers or heads being shown in section.
Fig. 12 is a similar perspective view illustrating an accessory to be used in the lower end of the chute and by which a selection of one or more lines of type is obtained.
Fig. 13 illustrates one of the extra or selected type.
Figure 4:
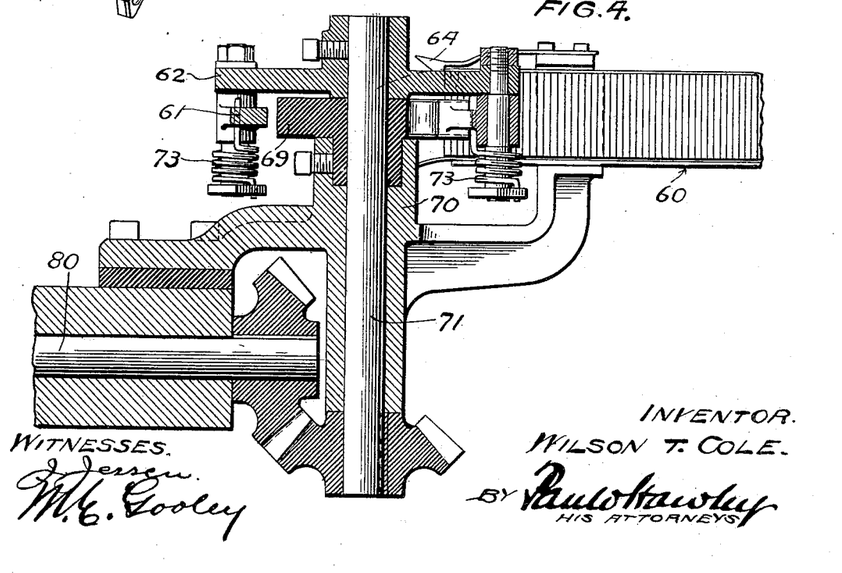
Fig. 4 is a vertical section substantially on the line $x\,x$ of Fig. 3.

If some addresses require an extra line or slug, the extra slugs may be provided for by notching such extra slug, as shown in Fig. 13, and employing the yielding lugs 48 in the bottom of the chute, as shown in Fig. 12. An "extra" slug will drop down to the ledge 46, while the plain slugs will rest upon the lugs 48 in readiness to be caught by the carrier. The grippers arrive beneath the delivery-chute in their lowered positions and receive the type while in such position. By the time the drum makes a quarter-revolution the grippers and the type therein are raised, as described. At the quarter-point the type contact with an inking-roll 50, the shaft of which is preferably arranged in inclined slots 51 in the frame 52, gravity being depended upon to hold the yielding inking-roll in contact with the type as they pass. Beneath the drum is an impression-roll 53, pressed upward by springs 54, acting on the bearings thereof, and the folded or rolled papers or other articles 55 are carried across the roll 32 by a suitable traveling platen or conveyer 56, provided with arms 57. The papers are fed upon the conveyer from the hopper 58, and as they pass the impression-roll are compressed and flattened thereon by a guard plate or plates 59, arranged above the said roll. The type-carriers pass between the plates 59. Suitable means are provided for driving the conveyer-belt from the sprocket 9. After substantially a three-quarters movement of the drum the type carriers or heads as they arrive at the three-quarters position are rotated by their springs, and as they rotate the gripping-jaws are opened. At this time the type are struck and forcibly taken from the carrier-jaws and thrown into the discharge-chute 60. The discharge-chute 60 is arranged horizontally, and the type-carriers pass the end thereof at the moment that one of the wings or arms 61 on the rotary head 62 engages with the type to force them out of the carrier-head and into the chute 60. To save friction, the chute is preferably provided with ribs 63. The slugs are caught in the end thereof by a spring detent or hook 64 and kept from falling over by a slidable backing-block 65. This block is held by the friction-fingers or tongs 66, which slide in the slot 67, provided in the bottom of the chute. The tongs are expanded in the slot by a spring 68, arranged between the handles of the tongs. When the handles are pressed together, the ends of the tongs may be disengaged from the slot and the block then removed from the chute. In order that the head 62 and the arms thereof may operate as closely to the chute as possible, it is necessary to provide means for retiring the wings or arms as soon as they have struck the type and carried the same into the chute. This is accomplished by the use of a quick-drop cam 69, fixed on the bearing 70 of the shaft 71. The shaft carries the head 62, and said head is provided with several of the wings or arms 61, each of which has a foot 72 to engage the cam, while springs 73 force the arms back as the feet thereof drop from the highest point of the cam 69. The shaft 71 is driven from the shaft 80, and the shaft 71 revolves twice to every revolution of the drum 13, the shaft 80 being connected therewith by gear-wheels 10 and 81.

Figure 1:
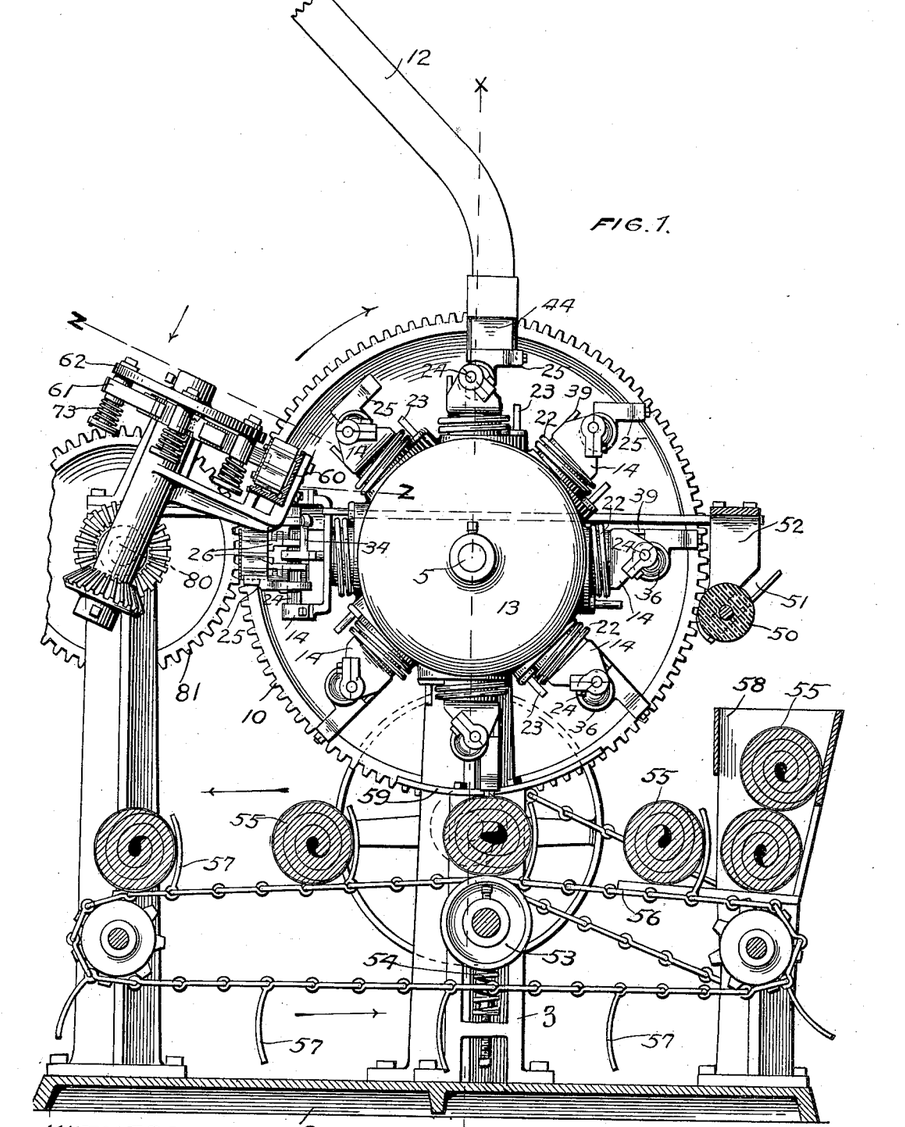
Figure 1 is an end elevation of a machine embodying my invention, the lower part thereof being in section substantially on the line $x\,x$ of Fig. 2.
Figure 2:
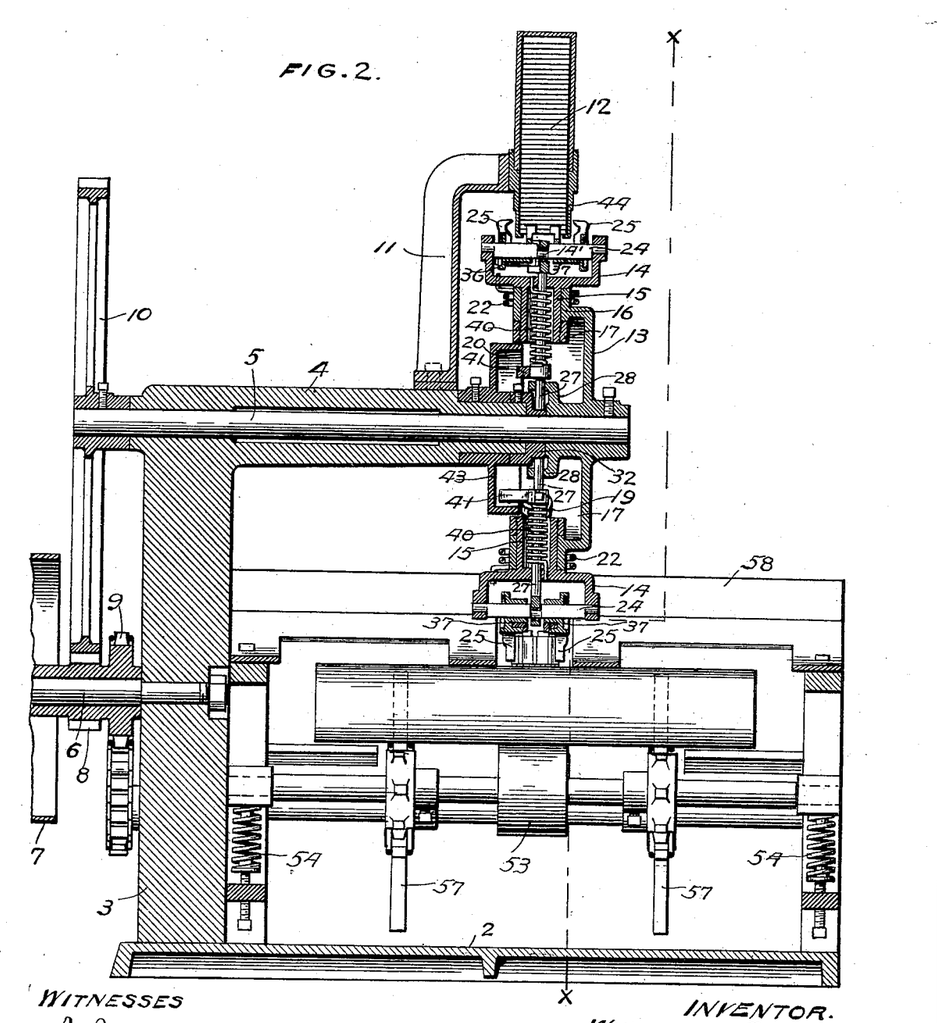
Fig. 2 is a longitudinal and vertical section on the line $x\,x$ of Fig. 1.
Figures 5, 6:
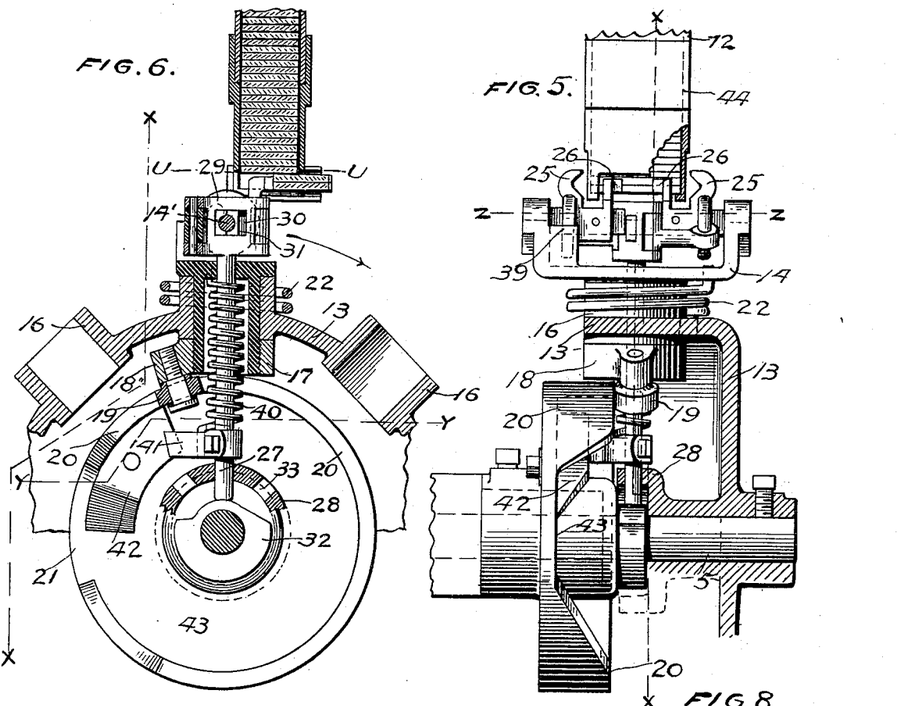
Fig. 5 is an enlarged detail taken from Fig. 1 and on the line $x\,x$ of Fig. 6.
Fig. 6 is a transverse section on the line $x\,x$ of Fig. 5.
Figure 7:
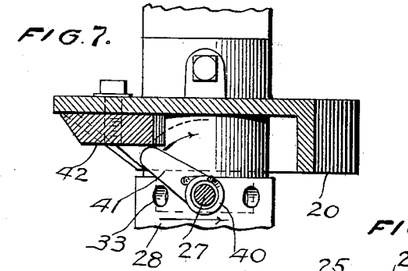
Fig. 7 is a horizontal section on the line $y\,y$ of Fig. 6.
Figure 8:
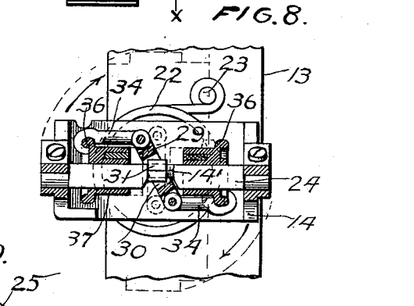
Fig. 8 is a horizontal section on the line $z\,z$ of Fig. 5.
Figure 9:
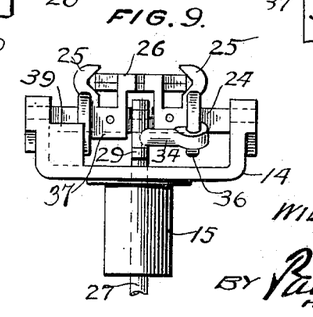
Fig. 9 is a detail taken from Fig. 5 and showing the gripping or clamping jaws of the type-carrier engaged upon the type-slugs or linotypes.
Figures 10, 11, 14:
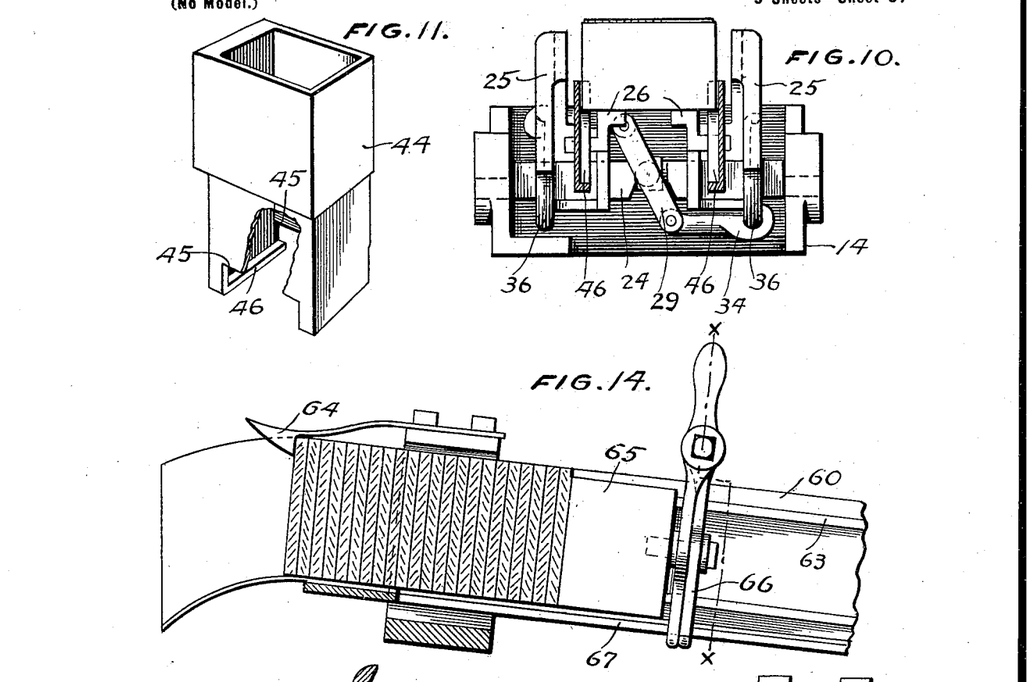
Fig. 10 is an enlarged horizontal section of the delivery-chute on the line $u\,u$ of Fig 6 and shows the carrier or head beneath the chute.
Fig. 11 is a perspective view showing the lower end of the delivery-chute.
Fig. 14 is a plan sectional view of the discharge-chute.

The operation of my machine is as follows: The pulley 7 is driven by a suitable belt and imparts through the several gears and belts a continuous rotary motion to the drum or cylinder, the traveling conveyer, and the type striker or removing device. Before the machine is started the delivery-chute is preferably filled with the type-slugs or linotypes. The same are placed in the chute 12 in order—that is, the slugs are arranged alone or in sets where two or more lines are required to give a complete name and address and the sets are arranged one upon the other in the chute to drop to the bottom thereof as the lower set is removed by a type-carrier. The machine may be adapted to handle either single slugs or two or more at a time in each type-head by simply making the type-outlet opening at the bottom of the chute of a size corresponding to the thickness of the number of slugs to be taken therefrom, or the chute, with the yielding lug (shown in Fig. 12) may be used, and, if desired, amplified to provide for a greater opportunity for selectively feeding sets of different numbers of slugs to successive gripping type heads or carriers. The delivery-chute is vertically arranged above the drum or cylinder to feed the type by gravity; but the lower type in the chute, at the bottom, are relieved of the weight of the greater number of slugs or type by making a bend in the chute and carrying the upper part thereof off at an incline which is just sufficient to insure the sliding of the slugs therein. The bend in the chute is made at a short distance above the bottom of the chute, so that there are really very few type the weight of which oppose the removal of the lower type by the gripping-heads. When by the rotation of a drum or cylinder a carrier-head comes into position beneath the lower end of the delivery-chute, the yoke portion of the head, with the crank-shaft therein, will stand parallel with the shaft 5—that is, transversely upon the face of the drum—and the gripping-jaws will be parallel with the sides of the delivery-chute. The yoke is so held parallel with the shaft 5 by the engagement of the yoke-roller 19 thereof with the raised part of the stationary side cam 20. At this time also the stem 27 of the swinging link 29, which forms a part of the head, will be in its depressed position, as the inner end of the stem is at such time upon the low part of the stationary cam 32. While the stem is in its lowered position, the crank-shaft is also lowered and therewith the gripping-jaws, which jaws will lie in a plane substantially parallel with the face of the drum and with the lower slug in the delivery-chute. The pusher-lugs, which have a spreading movement with the gripping-jaws, will at this time be raised into position to pass through the side notches in the chute and between the ledges 46 thereof and engage the bottoms or rear edges of the slug or slugs resting upon the said ledges 46. As the drum continues to rotate the slugs will therefore be forced along and off of the ledges 46 and out of the chute. While the head is opposite the chute, the jaws are distended to pass on the outer sides thereof, as shown in Fig. 5. They are held in this position by the engagement of the arm 41 with the raised part or surface of the stationary cam 42, which arm holds the link in its oscillated or turned position to distend the links 34, and therewith the jaws 25, as well as the pushing-lugs 26. The pushing-lugs move with the jaws as a matter of convenience in construction rather than as a necessity. At the moment that the slug or slugs which are being moved by the pusher-lugs are about to pass from engagement with the slugs lying thereon in the chute the arm 41 drops from the abrupt end or shoulder of the cam 32, and the rod 27 and link 29 are rotated by the spring 40 to suddenly draw in the gripping-jaws 25, which meantime have passed beyond the forward edge of the chute, and the same and the jaws will firmly engage the edges or ends of the slugs forced out by the pusher-lugs. The slugs or linotypes are leveled and alined in the jaws by the V-surfaces of the jaws and are leveled by the pusher-lugs, which remain in engagement with the lower edges thereof. Even after the jaws are raised by the continued rotation of the drum the continued rotation of the drum results in the rod 27 being lifted by the cam 32, and the consequent rotation of the crank-shaft and the raising of the gripping-jaws is shown in Fig. 1. After a quarter-revolution the crank-shaft is completely raised, and the jaws and the type therein are lifted or distended to a position substantially perpendicular to the drum, in which position they are held as they pass the inking-roll and the impression device. The papers are simply fed into the hopper 58 and fall upon the traveling conveyer, and are thereby carried between the roll 53 and the conveyer-plates 59, where they are compressed and flattened, so that an even surface is provided to receive the imprint from the type upon the drum. The drum and the roll 53 practically rotate at the same speed—that is, a paper is carried over the roll 53 just at the instant that the type arrive opposite said roll. The paper having been addressed is finally discharged over the end of the belt or conveyer, while the continued rotation of the drum carries the head and the type therein upward until after about three-fourths of a revolution of the roller 19 of the head-yoke drops into the notch 21 in the said cam 20, whereupon the yoke is partially rotated by its spring 22 to carry the type into a substantially vertical plane transverse to the axis of the drum. Immediately following this movement and before the drum has time to rotate more than a few degrees the arm 41 of the link-stem 27 strikes the incline of the cam 42 and is raised to rotate said rod and oscillate said link, and thereby throw out the grippers 25 to free the type-slugs held therein. At the same instant the grippers are released the head and the type will have arrived opposite the end of the discharge-chute, and at this instant the type or slugs will be struck and forced out laterally into the end of the chute by the action of one of the wings 61 upon the rotating head 62. The wing forces or sweeps the slug into the chute and against the other slugs and pushes all of the slugs back until the last slug is caught by the hook or pawl 64. The wing is then retired by its spring, the foot 72 of the wing at such instant dropping from the high point of the stationary cam 69. To reduce the size of the strikerhead, I prefer to use only four wings thereon and give the head twice the speed of the drum. After passing the discharge-chute the roller 19 of the T-head is carried out of the notch in the cam 20 and up upon the high part thereof, thereby returning the yoke to its first position—that is, parallel with the drumshaft. The arm 41 meantime remains in engagement with the high portion of the cam 42, so that the gripper-jaws are separated, while the foot of the rod 27 drops upon the low part of the cam 32 to depress or lower the jaws, so that they may pass beneath the chute and be ready to receive the next slug or slugs from the delivery-chute. The action of all of the type-heads is the same throughout, one following the other in rapid succession.

The principal advantage of my machine arises from the rotary action of all its parts, which may be made to operate at a high speed with accuracy and precision.

A further advantage lies in the employment of a gravity chute or feed for the slugs or linotypes, whereby any moving parts for feeding the same are dispensed with, while the lateral discharge of the slugs into a horizontal chute insures their rearrangement in the exact form in which they were first placed in the delivery-chute.

A further and particular advantage of my machine lies in the positive action of all parts thereof, the slugs being forcibly removed from the supply-chute and forcibly swept from the moving heads into the delivery-chute.

Obviously various portions of the mechanism might be modified without departing from the spirit of my invention, and I therefore do not confine the same to the specific construction herein shown and described.

Having thus described my invention, I claim as new and desire to secure by Letters Patent—

1. In an addressing-machine, the combination, with a stationary type-holder, of a type-carrying device movable with respect thereto, and means operating said carrier to positively extract type from said holder, and relatively movable grippers arranged on said carrier to hold the type for the printing operation, substantially as described.

2. In an addressing-machine, the combination, of a type-slug carrier, and means for moving the same, with means for holding the type-slugs in the path of said carrier, and said carrier adapted to positively engage and remove the type-slugs from said holding means, and being relatively movable to grip the ends thereof and hold the same, substantially as described.

3. In an addressing-machine, the combination, of a type-slug carrier and means for moving the same, with means for holding the type-slugs in the path of said carrier, said carrier having a part or parts to positively engage and remove the slugs from said holding means, and said carrier being also provided with gripping-jaws and means for positively actuating said jaws, said parts of the carrier operating together to aline and hold a slug or slugs, substantially as described.

4. In an addressing-machine, the combination, of a relatively stationary type-holder and a moving type-slug carrier, with means in connection with said carrier to force a slug or slugs from said holder, relatively movable grippers upon said carriers to grip the ends of said type, and means for actuating said grippers to engage and release the type-slugs, substantially as described.

5. In an addressing-machine, the combination, of a type-slug holder, with a drum having a type carrier or head, pushers upon said carrier-head, gripping-jaws also provided thereon, means for actuating said jaws to grip the slugs, and means for raising said jaws to a position perpendicular to said drum to present the type for printing, substantially as described.

6. In an addressing-machine, the combination, with the movable carrier, of a gripper or holder, operable to engage and tangentially hold type-slugs, and also operable to raise or lift the slug or slugs so gripped to another position with respect to said carrier, for the printing operation, substantially as described.

7. In an addressing-machine, the combination, of a movable type-carrier, with the stationary type-holder arranged to present the type sidewise toward said carrier, a type-gripping head provided on said carrier and having jaws to engage the ends of said slugs, means for changing the position of said jaws and said slug with regard to said carrier, means to open said jaws and free the type, and positive means for removing the type and returning the jaws to their original position with regard to the carrier to receive the next slug, substantially as described.

8. In an addressing-machine, the combination, of a movable type-carrier and means for presenting type in proximity thereto, with means upon said carrier to engage and hold said type, means for swinging or raising said means and the type to position the same, first for printing and then for removal, and means for releasing the type and removing the same, substantially as described.

9. In an addressing-machine, the combination, of a rotary drum, with a type-slug holder presenting the slugs tangentially with respect to said drum, lugs and grippers provided on said drum to remove the type from said holder and engage the same, means for moving said grippers to a perpendicular position with respect to the drum, means for opening the same to free the type, and means for depressing said grippers, substantially as described.

10. In an addressing-machine, the combination, of a type-holder, with a drum arranged opposite the end thereof and provided with a type carrier or gripper to take type from said holder, means to raise said carrier or gripper perpendicularly to said drum to position the type for printing, and a mechanism to engage the type and remove the same from the carrier while it is in its raised position, substantially as described.

11. In an addressing-machine, the combination, of the oppositely-arranged type-grippers, movable toward and from one another and together movable with respect to the part whereon the same are mounted, to present for printing type held in said grippers, substantially as described.

12. In an addressing-machine, the combination, of a type-carrier, with a suitable type holder or chute adapted to present the type in a plane parallel with the movement of said carrier, and said carrier having a part to engage the edge of the type and force the same from said holder or chute, and also provided with gripping-jaws to engage the ends of the type and hold the same in printing position, substantially as described.

13. In an addressing-machine, the combination, of a type-carrier, with a holder or chute to present the type to the carrier in a plane parallel with the movement thereof, and said carrier adapted to engage and raise the type to a perpendicular position for printing, substantially as described.

14. In an addressing-machine, the combination, of a type-carrier, with a holder or chute to present the type thereto in a plane substantially parallel to the movement of said carrier, said carrier adapted to engage and force the type from said holder or chute, and having gripping parts to catch the said type, means for raising the said type into printing position, means for partially rotating the carrier while the type are so raised, and means to engage the type in the rotated position and whereby the type are removed from the carrier, substantially as described.

15. In an addressing-machine, the combination, of a type, chute or holder, with a moving type-carrier provided with pivoted and separable gripping-jaws and having pusher-lugs to engage the type in said holder and force the same therefrom to be engaged by said jaws and thereby moved into printing position, substantially as described.

16. In an addressing-machine, the combination, of a type carrier or head, with means for feeding the type to said carrier or head, and a rotary mechanism to strike the type in said carrier and disengage the same therefrom, substantially as described.

17. In an addressing-machine, the combination, of a rotary part having a type carrier or head, of means for feeding the type to said carrier and securing the same therein, and a rotary mechanism to intercept and remove the type from said carrier, substantially as described.

18. In an addressing-machine, the combination, of a continuously-rotating part, with a type-carrier provided thereon, means for securing the type in said carrier during the movement thereof, and a continuously-rotating part to take the type from said carrier, substantially as described.

19. In an addressing-machine, the combination, of a tilting head, with a gravity-chute and a horizontal discharge-chute, and means for moving said head into positions to receive and discharge the type from and into said chutes, respectively, substantially as described.

20. The combination, in an addressing-machine, of a moving part, with a tilting head mounted to rotate on said part, and means to rotate said head to position the same to receive and discharge type, substantially as described.

21. The combination, with a moving part, of a type carrier or head arranged thereon and having both rotary and tilting movements to position the type held therein for removal therefrom, substantially as described.

22. In an addressing-machine, the combination of the oppositely-arranged type-grippers, movable toward and from one another and together movable with respect to the part whereon the same are mounted, to present for printing type held in said grippers, with a type-holder from which the type are fed to said grippers, and said grippers being provided with positive type-slug-alining means, substantially as described.

23. In an addressing-machine, the combination, of a type-carrier, with a continuously-rotating part to strike the type out of said carrier, substantially as described.

24. In an addressing-machine, the combination, of a rotary part or drum, with a series of type-carriers arranged thereon, and means whereby the rotary movement of said parts or drum tilts or raises said carriers to perpendicular positions with respect to the drum to arrange the type therein for the printing operation, substantially as described.

25. In an addressing-machine, the combination, with a rotary drum or cylinder, of a series of type carriers or heads provided thereon to hold type, and an independent rotary mechanism to intercept said carriers and remove the type therefrom, substantially as described.

26. In an addressing-machine, the combination, of a drum or cylinder, with a series of type carriers or heads provided thereon and adapted to hold type fed thereto, means for successively swinging the type into a plane transverse to the axis of said drum, and means to intercept the type while in such position, whereby the same are removed from the carriers, substantially as described.

27. In an addressing-machine, the combination, with the drum or cylinder, of type-slug carriers having longitudinally-movable grippers to engage the ends of the type-slugs or linotypes, substantially as described.

28. In an addressing-machine, the combination, with the rotary part or drum, of a series of type-carrying jaws provided thereon, and longitudinally movable to engage the ends of the type-slugs fed thereto, substantially as described.

29. In an addressing-machine, the combination, with a moving part, of pusher-lugs and jaws movable thereon to engage the ends of type-slugs fed thereto, substantially as described.

30. In an addressing-machine, the combination, with a drum, of a series of type-carrying jaws arranged thereon, means for moving the jaws longitudinally with respect to the axis of the drum to engage the edges of type-slugs or linotypes fed thereto, and means for raising said jaws into substantially radial positions with respect to the drum, to print, and means for automatically releasing the type from said jaws, substantially as described.

31. The combination, of a rotary drum, with tilting jaws arranged thereon and operating longitudinally of the axis of the drum to automatically grip and hold type, substantially as described.

32. The combination, of means for feeding type-slugs, with a rotary part or drum, a series of gripping devices longitudinally movable with respect to the drum to grip the ends of the type-slugs fed thereto by said means, a suitable chute or guide, means for printing from the type held in said jaws, and means for opening said jaws to release the type therefrom, substantially as described.

33. In an addressing-machine, the combination, with a rotary drum, of a series of type-carriers arranged upon said drum, and movable to receive type arranged sidewise to the drum, to present the type for printing and afterward present the type sidewise to the end of a chute or holder which is substantially parallel to the axis of the said drum, substantially as described.

34. In an addressing-machine, the combination, of a rotary part or drum, with a series of gripping devices provided thereon, a gravity-chute to deliver the type-slugs sidewise to said drum to be engaged by said gripping devices, means for lifting or tilting the type upon the drum, a transverse discharge-chute, and means for simultaneously rotating said gripping devices and opening the same to present the type-slugs sidewise to the end of said transverse discharge-chute, substantially as described.

35. In an addressing-machine, the combination, of a drum or cylinder provided with a series of type carriers or heads, with a rotating head provided with arms or wings to intercept the type in said carriers and remove the same therefrom, substantially as described.

36. In an addressing-machine, the combination, of a cylinder or drum, with a series of type carriers or heads provided thereon, a rotary head provided with wings to intercept the type in said carriers after the printing operation, a chute into which said rotary head is adapted to carry the type, and means for automatically retiring the arms or wings to prevent interference between the same and said chute or the type lodged therein, substantially as described.

37. In an addressing-machine, the combination, with a type-carrier, of a type-delivery chute, and means in connection with said chute for feeding either one, or more, type to said carrier, substantially as described.

38. In an addressing-machine, the combination, with a type-carrier, of a delivery-chute having within itself means whereby either one, or more, type may be fed to said carrier at a time, substantially as described.

39. In an addressing-machine, the combination, with a type-carrier, of a type-delivery chute, plain and "extra" type to fit therein, and said chute having means to hold both an extra type and plain type in position to be fed to said carrier, substantially as described.

40. A delivery-chute for addressing-machines, comprising an open-bottomed tube, having a side opening or notch, and provided with yielding projections opposite said notch, as and for the purpose specified.

41. A delivery-chute, comprising, in combination, a suitable guide, having an opening in its bottom or end, and provided with ledges, as described, with yielding projections forming rests for plain type and adapted to yield to permit the removal of extra type, substantially as described.

42. In an addressing-machine, the combination, with a rotary drum or cylinder, of a rotary yoke provided thereon, means operated by the rotation of said drum to rotate said yoke, and grippers carried by said yoke, substantially as described.

43. In an addressing-machine, the combination, with a rotary drum or cylinder, of a rotary yoke provided thereon, means operated by the rotation of said drum to rotate said yoke, grippers carried by said yoke, and means also operated by the rotation of said drum to open and close said grippers, substantially as described.

44. The combination, in an addressing-machine, of a rotary drum or cylinder, with gripping and pusher parts carried thereby, and means operated by the rotation of the drum to raise or tilt said part, substantially as described.

45. The combination, in an addressing-machine, of a rotary drum or cylinder, a shaft carried thereby, gripping-jaws movable upon said shaft but adapted to rotate or rise therewith, and means operated by the rotation of the drum to rotate said shaft, substantially as described.

46. The combination, in an addressing-machine, of a rotary drum or cylinder, with a crank-shaft carried thereby, gripping-jaws movable to engage type, and a connecting-rod operated by the rotation of said drum and in turn adapted to rotate said shaft and move said jaws, substantially as described.

47. The combination, in an addressing-machine, of the drum, with a crank-shaft provided thereon, a connecting-rod for said crank-shaft, a cam in engagement with said rod, a second cam for rotating said rod, gripping-jaws operated by the rotation of said rod, and said drum and cam being relatively rotatable, substantially as described.

48. The combination in a drum or cylinder, of a crank-shaft, a connecting-rod to operate said crank-shaft and operated by the rotation of the drum, the gripping-jaws slidable on said crank-shaft, means for rotating said connecting-rod, and links connecting said rod and said jaws, as and for the purpose specified.

49. In an addressing-machine, the combination, with a rotary drum, of tilting jaws provided thereon, means for opening and closing the jaws, and said means and the jaws having sliding connections to permit the tilting of the jaws, substantially as described.

50. In an addressing-machine, the combination, with a rotating type-carrier, of the striker-head provided with a suitable arm to engage the type in said carrier, and a stationary cam controlling the position of said arm, substantially as described.

51. In an addressing-machine, the combination, with a multiple type-carrier, of a striker-head rotating in time therewith and provided with an arm to engage the type on said carrier, said arm rotating with said head, and a stationary cam to distend said arm and means for retiring the same, substantially as described.

52. The combination, in an addressing-machine, of a rotary type-carrier, with an impression-roll, and the guard-plates 59 to compress an article upon the impression-roll, substantially as described.

In testimony whereof I have hereunto set my hand this 5th day of June, A. D. 1897.

WILSON T. COLE.

In presence of—
C. G. HAWLEY,
M. E. GOOLEY.